(12) United States Patent
Himmelein et al.

(10) Patent No.: US 10,807,300 B2
(45) Date of Patent: Oct. 20, 2020

(54) THREE DIMENSIONAL THERMOFORMING OF PLASTICS WITH ELECTRONIC COMPONENTS

(71) Applicants: Fred Himmelein, Scottsdale, AZ (US); Edward J. Gasiorek, Phoenix, AZ (US)

(72) Inventors: Fred Himmelein, Scottsdale, AZ (US); Edward J. Gasiorek, Phoenix, AZ (US)

(73) Assignee: HYTECH WORLDWIDE, INC., Phoenix, AZ (US)

( * ) Notice: Subject to any disclaimer, the term of this patent is extended or adjusted under 35 U.S.C. 154(b) by 122 days.

(21) Appl. No.: 15/807,437

(22) Filed: Nov. 8, 2017

(65) Prior Publication Data
US 2019/0134881 A1    May 9, 2019

(51) Int. Cl.
| | | |
|---|---|---|
| *B29C 51/12* | (2006.01) | |
| *B29C 51/02* | (2006.01) | |
| *B29C 51/20* | (2006.01) | |
| *B29L 31/34* | (2006.01) | |
| *B29C 51/08* | (2006.01) | |
| *B29K 105/04* | (2006.01) | |

(52) U.S. Cl.
CPC ............. *B29C 51/12* (2013.01); *B29C 51/02* (2013.01); *B29C 51/082* (2013.01); *B29C 51/20* (2013.01); *B29K 2105/04* (2013.01); *B29L 2031/34* (2013.01)

(58) Field of Classification Search
CPC ................................. B29C 51/12; B29C 45/02
See application file for complete search history.

(56) References Cited

U.S. PATENT DOCUMENTS

| | | | | |
|---|---|---|---|---|
| 4,239,727 | A * | 12/1980 | Myers ................... | B29C 51/002 264/321 |
| 4,445,953 | A * | 5/1984 | Hawk ..................... | B29C 51/14 156/102 |
| 4,680,617 | A * | 7/1987 | Ross ....................... | B29C 43/18 174/530 |

(Continued)

OTHER PUBLICATIONS

Journal of Applied Polymer Science/vol. 89, Issue 9: Akatsuka, Study of high thermal conductive epoxy resins containing high-order structures (Year: 2003).*

*Primary Examiner* — Matthew J Daniels
*Assistant Examiner* — Wayne K. Swier
(74) *Attorney, Agent, or Firm* — Bycer Law, PLC; Matthew L. Bycer (57) ABSTRACT

A system and method for forming plastic sheet into a three-dimensional shape. The plastic sheet may include one or more sheet-mounted components, such as electronics, that must be shielded from excessive heat, pressure, and/or crushing when the formation of the sheet occurs. A recess will be formed to protect against directly contacting sheet-mounted component. The recess may be aligned along the heating plate and/or the form core and/or along a protective blanket which may be set over (and under) sheet prior to heating/forming. The sheet is registered (with or without a blanket) onto a base plate, and preferably over a form core. The sheet is then raised to contact with a heating plate, and then placed downward over the (optionally heated) form core. Recess(es) align in locations corresponding to mounted component to protect same.

20 Claims, 11 Drawing Sheets

(56) References Cited

U.S. PATENT DOCUMENTS

| | | | | |
|---|---|---|---|---|
| 5,979,043 | A * | 11/1999 | Baker | B29C 45/14467 |
| | | | | 156/245 |
| 6,032,357 | A * | 3/2000 | Wojewnik | B60R 16/0207 |
| | | | | 156/219 |
| 6,090,728 | A * | 7/2000 | Yenni, Jr. | H05K 9/0026 |
| | | | | 442/117 |
| 6,257,866 | B1 * | 7/2001 | Fritz | B29C 51/06 |
| | | | | 425/387.1 |
| 7,985,062 | B2 * | 7/2011 | Chesney | B29C 51/10 |
| | | | | 425/342.1 |
| 2007/0069418 | A1 * | 3/2007 | Liao | B29C 51/12 |
| | | | | 264/238 |
| 2016/0192474 | A1 * | 6/2016 | Niskala | G06F 1/163 |
| | | | | 361/679.55 |
| 2016/0345437 | A1 * | 11/2016 | Heikkinen | H01L 23/5387 |
| 2018/0290356 | A1 * | 10/2018 | Isohatala | B29C 45/1642 |

* cited by examiner

THREE DIMENSIONAL THERMOFORMING OF PLASTICS WITH ELECTRONIC COMPONENTS

FIELD OF THE INVENTION

The present invention relates to apparatus for forming plastic sheet and, more particularly, to accurately thermoforming a plastic sheet to accommodate sheet-mounted electronics.

BACKGROUND OF THE INVENTION

Thermoforming sheet material is performed by contact heating of the sheet to at least the softening (glass) temperature prior to contact with a tooling surface of a form core. Distortions on the sheet are avoided by use of air pressures, uniform heating, and other aspects of the forming procedure. An advanced process of the related art is shown and described in U.S. Pat. No. 6,257,866 to Fritz, et al. hereby incorporated by reference.

One common high pressure forming process is known as ACCUFORM. Thermoforming plastic sheet material in conformance with a form core is initiated by locating the sheet material against a heated planar plate, or platen surface. Form cores may be male (generally convex) or female (generally concave, also referred to as form cavities). Air pressure is used to position the sheet material adjacent the surface. Heat from a plate can be uniformly transferred by conduction (often through contact) to the sheet material. Advanced methods utilize rapid reversal of the air pressure applied to opposed sides of the heated sheet material, to deep draw the sheet about a form core.

Registration pins, or the like, fixedly position the sheet material with respect to the base plate (and thereby with respect to a form core) to ensure registration of the indicia, features, or mounted items, with the corresponding surfaces of the form core. The use of temperature sensors sensing heat radiating from the heating surface or top platen during the heating step permits controlled heating without impinging upon, or otherwise affecting, the sheet material during either heating, forming, or cooling of the sheet material. If two or more sheets are adjacent one another, they can be fused or bonded to one another during the heating step.

Presently, formed sheets are being fitted with electronics, such as conductive inks and electronic components after the forming process. Current forming systems known in the art are not adapted to mounted electronics on unformed flat sheets, and will often compromise or otherwise disable the electronics on a sheet when cold formed or heat formed. The heat and mechanical processes compromise the function or destroy the electronics. At this time, there is a need to provide a forming process that can allow for electronics to be fitted onto a sheet prior to forming.

Therefore, it is an object of the present invention to provide a forming system capable of accommodating sheet-borne electronics.

It is a further object of the present invention to provide tooling platens or cores and/or heating platens that can provide forming of a sheet without compromising onboard electronics.

It is yet another object of the present invention to provide a method of forming a sheet with electronics while maintaining or enabling the sheet-borne electronics.

These and other objects of the present invention will be made clear in light of the further discussion below.

SUMMARY OF THE INVENTION

The present invention is directed to an apparatus for thermoforming a sheet of plastic material. The sheet must be deformable, and will preferably be made of a polymer-based plastic. The sheet may have a component, such as an electronic component, disposed or mounted on a surface of the sheet. The apparatus will form the sheet from a generally planar shape to a three-dimensional part. The forming of the sheet will be conducted without compromising function of mounted component, such as an onboard electronic. The formation will preferably be over a form core. The form core may have at least one recess on its surface corresponding with the location of the component disposed on the sheet. The recess may be adapted to prevent excessive heating of the sheet and/or adapted to allow space for the component when forming so as to avoid crushing the component or otherwise compromising the components function, so as to minimize damage to the component during subsequent heating and/or stretching of the sheet about the form core. The recess may provide an air gap space formed (of trapped air, or otherwise unfilled space) between the sheet with component(s) thereon and the form core.

The apparatus preferably includes a first platen for heating the sheet. The first platen may include a heating plate with a planar surface. The heating plate contacts against the sheet to impart heat to the sheet (thus softening) to allow forming of the sheet. A first pressure means (such as air pressure vacuum) may urge the sheet up against the heating plate. A base plate may serve to support a form core, while registration means (such as pins, magnets, etc.) will allow registering the sheet relative to the form core. A second pressure means (similarly air, vacuum, gravity, etc.) may urge the heated sheet to drape over the form core to deform and provide the three-dimensional formed part.

The present invention also includes an apparatus for thermoforming a sheet of plastic material having a sheet-mounted component disposed thereon into a formed part. A first top platen may be used to heat the sheet. The first top platen may include a heating plate having a planar surface against which the sheet is located to impart contact heat to the sheet. The heating plate may be placed within a cavity. The first top platen may include a bottom surface extending laterally circumferentially about the heating plate heating plate below the planar surface/cavity. A base plate may be used to support a form core. The base plate may be adapted to mate with the first top platen bottom surface to form a continuous compressible seal disposed in said first top platen, said continuous compressible seal being adapted to bear against the sheet and effect a seal between said first top platen and said base plate upon compression of said continuous compressible seat. A blanket may be set between the sheet and the heating plate. The blanket may include at least one relief (recess, indentation, etc.) corresponding with a location of a sheet-mounted component disposed on the sheet. (An additional) blanket may be set under the sheet between the form core and the sheet.

The present invention also includes an apparatus for thermoforming a sheet of plastic material having electronics disposed thereon into a formed three-dimensional part without compromising function of onboard electronics. A first platen may be provided for heating the sheet. The first platen may include a heating plate having a planar surface against which the sheet is located to impart heat to the sheet. A base plate (or lower platen) may be used to support a form core. The base plate may include registration means for registering the sheet relative to the form core and heating plate. The heating plate may include at least one recess. The recess will be located in a position corresponding with a location of an electronic disposed on the sheet and adapted to prevent excessive healing of the sheet and/or electronic at the location to minimize damage to the electronic during subsequent heating of the sheet. The recess may create an air gap space formed between the sheet and the heating plate. The recess may include an edge adapted to make initial contact with the plastic sheet material around an onboard electronic component.

The present invention also includes an apparatus for forming an article from a plastic sheet material with an electronic disposed on the plastic sheet material. A first and second platen may include first and second cavities separated from one another by (in part) the plastic sheet material. A heating plate will be located along at least one of the first and second platens and disposed along at least one of the first and second cavities. A form core (defining the article to be formed) may have a recess corresponding with the electronic disposed on the plastic sheet material. The form core may be heated. The recess may include an edge adapted to make initial contact of the plastic sheet material around the electronic to allow an air gap to prevent direct contact of the plastic sheet material at a location corresponding with the electronic with the form core so as to minimize damage to the electronic during subsequent heating and/or stretching off the sheet about the form core. A source may be provided to sequentially create a pressure environment in at least one of the first and second cavities to urge the plastic sheet material against the heating plate to heat the plastic sheet material and thereafter to urge the heated plastic material about the form core to form the article. The form core may also be heated. The form core may provide the first/initial heating of the sheet, or may provide for heating and forming after the sheet is heated on the heating plate. The first platen preferably includes a planar bottom surface extending laterally circumferentially about the first cavity to provide a continuous compressible seal disposed in the first platen. The surface may protrude past the planar bottom surface in its uncompressed state. The continuous seal may be adapted to bear against the plastic sheet material and effect a seal between the first and second platens upon compression of the continuous seal.

The invention also includes the method of thermoforming a sheet of plastic material. The sheet material may have at least one sheet-mounted component disposed thereon. The sheet will be formed into a three-dimensional formed part without compromising function of the mounted component. First a plastic sheet having at least one on-board component is registered onto a base plate. Second (or during or prior) a platen (with an optional heating plate) is heated to at least a glass deformation temperature of the plastic sheet material. Then the plastic sheet is forced into contact with the heated platen to transfer heat to the sheet. The plastic sheet is then removed from the heating platen. The step of forcing may include creating an air gap disposed around at least one component disposed on the sheet. This air gap may be formed via a recess or relief in the system to prevent direct contact of heating platen with the mounted component. The recess(es) may be located within an exterior surface of a form core upon the base plate. The recess(es) may be located along a surface of the platen. A blanket may be mounted onto the sheet prior to forcing the sheet against the platen. The blanket may have one or more recess or reliefs and the recess/relief may be aligned over at least one component on the sheet. The blanket may be a laminate that is laminated onto the sheet, either via heating or (low-tack) adhesive. The blanket may be placed over the sheet. The blanket is preferably a thermo-conducting material.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

The process for forming plastic sheeting utilizing air pressures to conform the plastic sheeting to a form core is as follows. A tool is mounted onto a table, the tool preferably having a form core imparted thereon. The form core may be set upon a tower platen (or base plate), may be formed within the base plate, or may be complimentary fitted into the base plate. Plastic sheeting, or a plastic sheet, is placed upon the tool, over the form core and at least portions of the base plate. Typically, the form core (or more usually the base plate) will include registration pins (or bosses) to mate with complimentary apertures within the plastic sheet so as to ensure proper alignment of plastic sheet over a form core and base plate. Plastic sheeting of the present invention will often include onboard electronics including but not limited to items such as conductive glue, conductive ink, insulation, graphics, indicia, resistors, or larger embedded electronics such as connection boxes, conductive ink strips, pushbuttons, LEDs, haptic feedback devices, cameras, MEMS, Bluetooth (and other wireless communication receivers and/or emitters), proximity sensors, near-field communications equipment, fingerprint sensors, temperature sensors, microphones, mirrors, microchips, RAM, FCB (flexible circuit board), and adhesives. Generally referring to these electronic components, the term electronic or electronics or electronic components may be used interchangeably.

In order to ensure that the electronics are not compromised, or otherwise damaged, when forming the plastic sheet, recesses will be placed within the heating apparatus, or forming apparatus, to prevent direct heating on the sheet where electronics are located. Conversely, the form core will include recesses, or both the platen and form core can include complementary or alternating recesses. In most embodiments, a heal platen is placed above the sheet mounted on the base plate, and the heat platen is heated high enough to cause plastic deformation of the plastic sheeting. Typically, the heat platen is made of aluminum, which can be heated in excess of 450 degrees Fahrenheit to achieve a heated sheet of approximately between 150 and 450 degrees Fahrenheit.

When recesses are provided on the exterior surface of the form core, this may be used to protect larger electronics on die bottom surface of the sheet, so as to (potentially allow the sheet to be heated upon contact with the heating platen, and) protect the on board electronics from being crushed or otherwise compromised via deformation of the plastic sheet directly adjacent to the electronics when the sheet is lowered (and deformed) over the form core. When a recess (or relief) is provided in the heating platen, the larger onboard electronics may be placed on the top side of lite plastic sheet so as to prevent heating at (and around) the electronics against the heating platen, and to otherwise prevent crushing or compromising of the top mounted electronics. Larger electronics can be provided on both top and bottom of sheet, and recesses may be formed in healing platen and form core in aligning locations, and/or offset locations.

In some embodiments, the table will rise to match the tool with the top heating platen. A healing surface (such as a heating plate) in the heating upper platen will directly contact (at least) portions of the plastic sheeting material to impart heat thereon, the heating platen will include a section (preferably a cavity) with the heating platen to fit the plastic sheet thereon. Air pressure can push the plastic sheet up to the heating platen, such air pressure supplied via apertures in the base plate, form core, or through the form core, for air pathways in the form core and/or around the form core to force the plastic sheet up into the healing platen to cause the heating surface to impart heat onto the plastic sheet.

Often, the heating surface will be coated with a material to prevent sticking, such as TEFLON or other like substance, and/or may have a surface that is not entirely flat that may be sandblasted, for instance using 1-4 micron sandblasting surface structure to provide dual purpose of preventing air escape while also preventing sticking of the sheet onto the platen. Air pressures used may be between one and ten bars of pressure. Optionally, the lower tool may also be healed to a lower temperature, such as 140-300 degrees V, to provide better definition when forming the plastic. The heating process can take from one second to sixty seconds depending on temperatures, thickness of sheet, etc. Pressure is then applied through the heating platen (above the sheet) to force the plastic sheet down onto the base plate and form core. This pressure may be from high pressure systems above the sheet or a vacuum provided below the sheet. The pressure is then exhausted and the platens are separated so as to access the sheets for removal etc.

The present invention is directed to 3D forming of thermoform plastics with electronic components embodied thereon. The electronic components can be formed or placed on the plastic sheet prior to forming by using this method and system. The system allows the plastic sheet to include embedded electronics and/or printed graphics and/or printed circuitry (such as via conductive ink), in or on a formed flat sheet. Use of conductive inks may cause the plastic sheet system to be thicker providing a 3D surface features upon the plastic sheeting. Once formed, the system should provide for a formed conductive circuitry within a specific resistance range. Certain circuitry will be formed and the stretching of the conductive inks or other circuitry may require a thicker conductive ink and/or circuitry that can be stretched, folded, etc. while still maintaining specific resistance properties.

Figure 8:
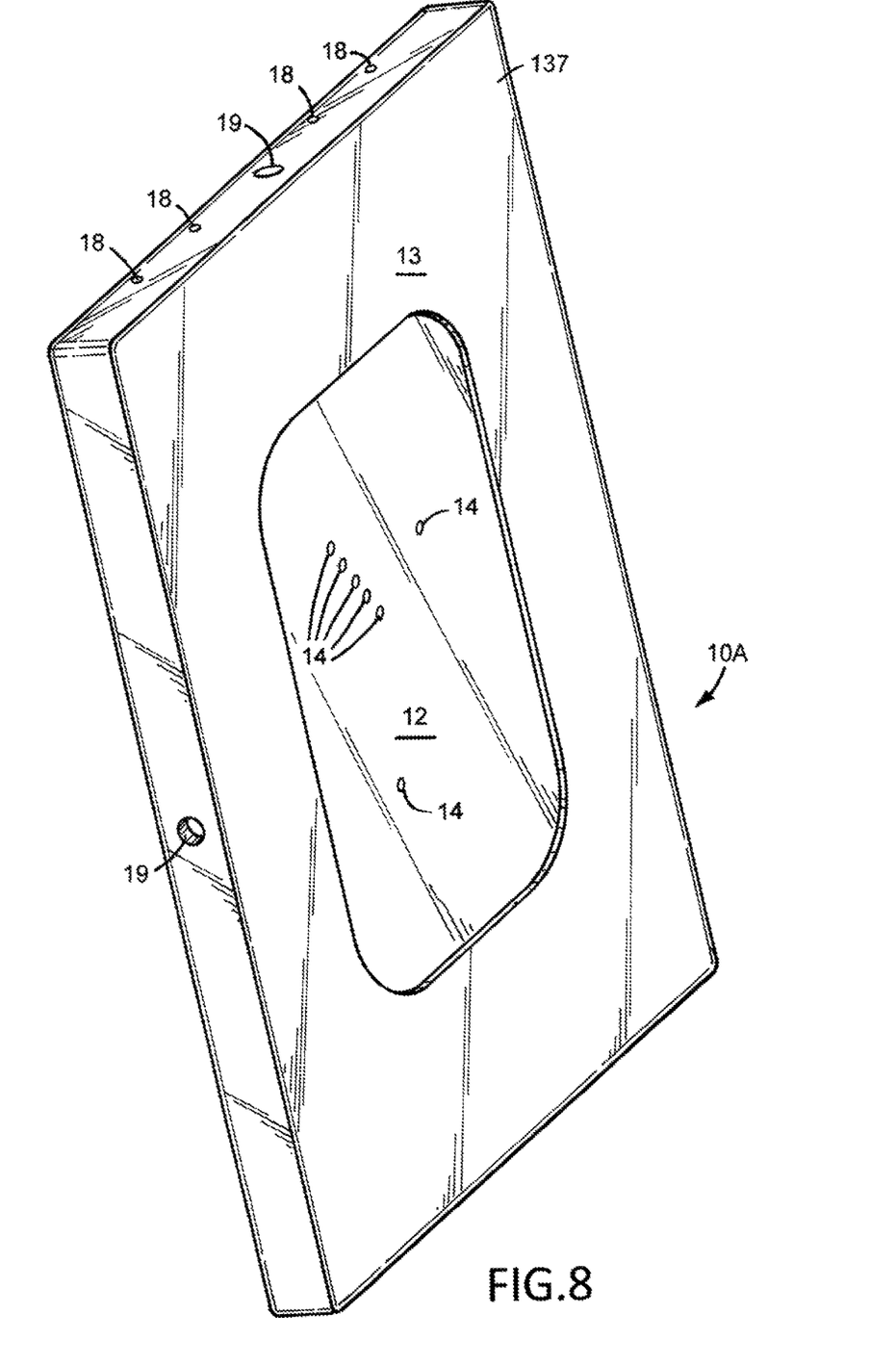
FIG. 8 a perspective bottom view of a heating platen of an embodiment of the present invention.
Figure 9:
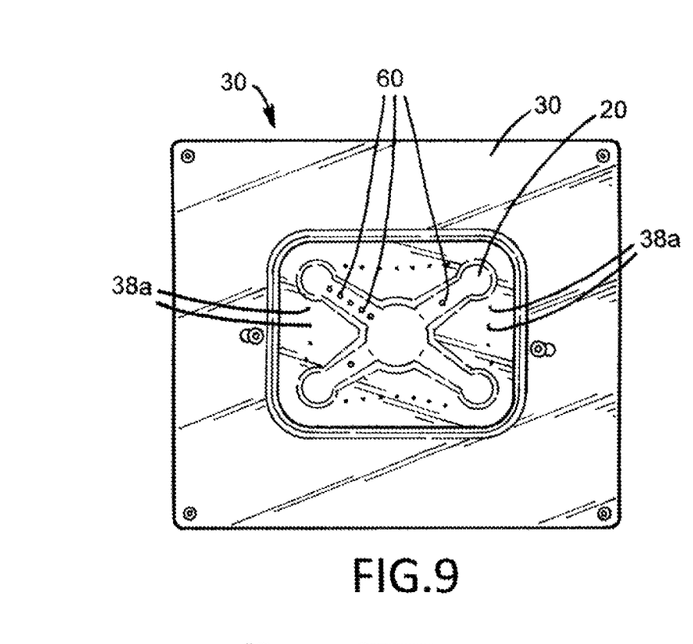
FIG. 9 is a top view of a male form core and base plate of an embodiment of the present invention.

In the embodiment shown in FIG. 8, the upper heating platen will include reliefs to avoid heating electronic components, such as LEDs, or crushing when a form core is pressed thereon with an electronic component carrying plastic sheet. The reliefs (or recesses) will match the pattern of the electronic components placed on the sheet over the form core. Therefore, the electronics are protected from damage and direct heating on the platen. The reliefs are sized such as they can surround the electronic component on the plane of the sheet, and may provide adequate spacing to prevent heating the electronic components laterally through the sheet. Air gaps will form within the recesses so as to prevent direct heating from the platen onto the electronic component, while the air serves as a resistance or gas shield to insulate or prevent excessive and quick heating of the electronic components embodied thereon. The gas bubbles formed with the recesses provide insulation to protect the electronic components.

The recesses may be round and/or may be shaped to provide protection of the electronic components thereon. Alternatively, if the location is meant to be deformed, such as along a sidewall, the recess may be shaped in alternative shapes to provide for a final shape as-is known in the art (tear drop, partial lunar, etc.). Typical depth may be between 0.016 to 0.18 inches. The planar size of the recess should be at least 4% larger in diameter than any electronic component thereon and may be as large as 10% or 15% larger than the components thereon so as to allow for proper forming of the plastic. The recess may include further non-stick material such as TEFLON, ceramic, or silicon or other insulators embedded within, or around, the recess so as to further insulate the electronic component. It is possible that an O-ring may be used around the recess to protect more sensitive and/or larger electronic components on the plastic sheeting. Conductive ink will allow for structures such as capacitive switches, or capacitive strips, where no mechanical switch is required. Haptic notification may be provided by further electronic components on the plastic sheeting.

Certain challenges with providing the safety and security of the electronic components on the plastic sheeting include providing the appropriate capacitance and/or resistance of conductive inks or other components on the plastic sheeting that will continue to work after deformation. Further, it is imperative that the plastic sheets be printed in a very repeatable manner where the location of various electronic components is positioned in the exact same location for industrial repeated forming of consecutive sheets. For instance, changes in location as small as 0.1 millimeters can affect the heating, and therefore integrity, of the electronic component. Adhering glue may be used to bond electronic components on the plastic sheeting prior to forming. There is an issue where the glue can heat up, transfer heat, or otherwise combust, causing issues with electronic components. Certain conductive epoxies are used to encapsulate electronic components that are 3-dimensional, or otherwise extend beyond the flat surface of the plastic sheet. The amount of conductive epoxy used is imperative. Distortion may also occur upon forming and this must be taken into account when printing the various electronic components and circuitry on the plastic sheeting to accommodate the new 3-dimensional form. Various attributes will be managed such as the shape of the recess holes. For instance, a circular hole may be used as the recess or relief; however a distorted hole, for instance a lunar shape may be necessary to provide for a more rounded shape in the final distorted form. As conductive ink bends in the deformation process, the movement of the circuit must be understood and repeatable from part-to-part on cycle-to-cycle so that the resistance of the circuitry remains within predefined requirements.

Figure 1:
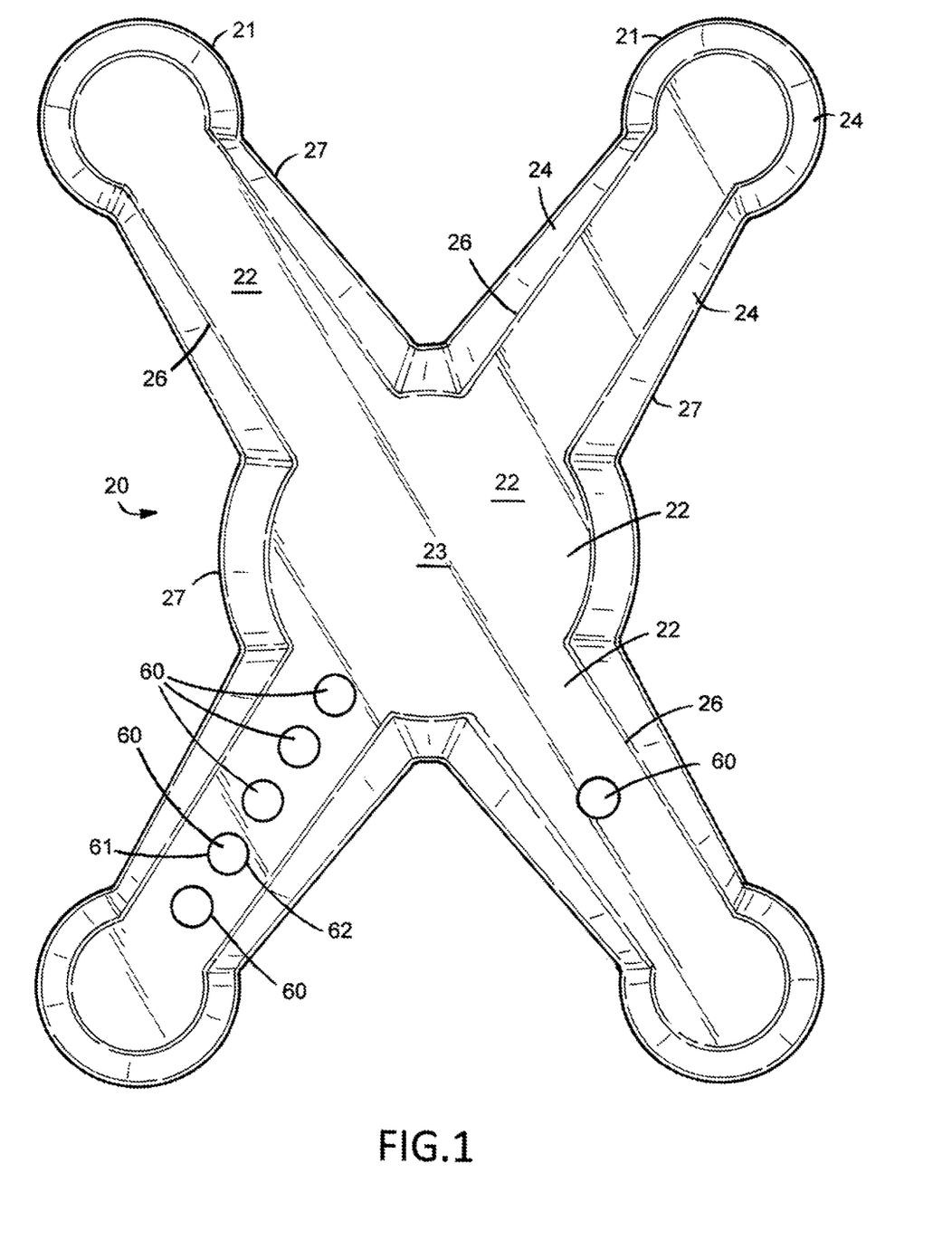
FIG. 1 illustrates a top view of a male form core of an embodiment of the present invention.
Figure 2:
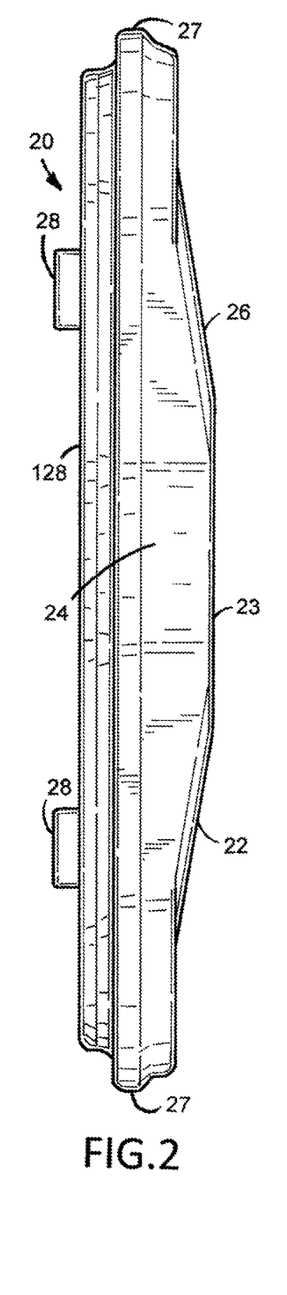
FIG. 2 illustrates a side view of a male form core of an embodiment of the present invention as shown in FIG. 1.
Figure 3:
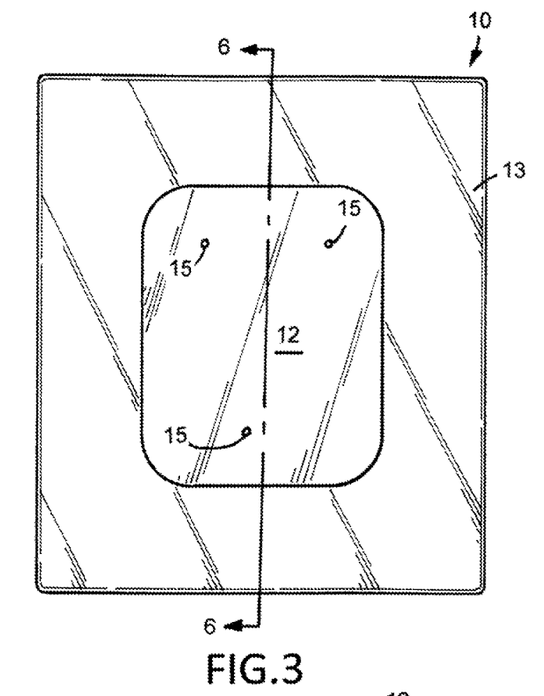
FIG. 3 illustrates a top view of heating platen of an embodiment of the present invention.
Figure 4:
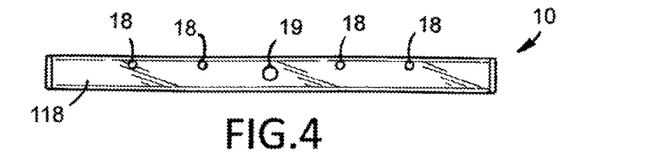
FIG. 4 illustrates a side view of a heating platen of an embodiment of the present invention shown in FIG. 3.
Figure 5:
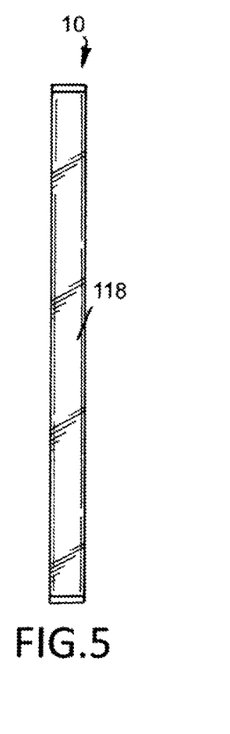
FIG. 5 illustrates a further side view of a heating platen an embodiment of the present invention shown in FIG. 3.
Figure 6:
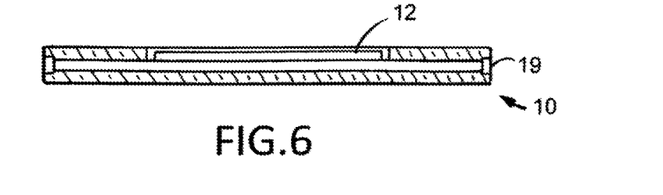
FIG. 6 cross-sectional view along line 6-6 of the heating platen embodiment shown in FIG. 3.

Referring to FIGS. 1 and 2, a male form core is shown as a removable model piece that can be fit onto a base plate. Form core 20 includes features 21, or shape that can be customized in many shapes, particularly useful for boards, panels, covers, etc. Form core 20 includes side walls 24, which are shown sloping or angled from top surface 22. Form core 20 includes top edge 26 forming the boundary between top surface 22 and side wall 24. A further bottom edge 27 forms the lower end of form core and may provide for gap venting through a base plate as is known in the art. Registration bosses 28 may be provided on the bottom side 128 of form core to allow registration with the base plate (not shown). Top plateau 23 is shown flat, and will align mostly parallel with a platen surface. When a plastic sheet (not shown) is placed on the form core, the form core top plateau preferably will not mate with the top platen for heating, and a force, such as air pressure from below, or vacuum from the top, will the sheet to the platen. A reverse force will then draw the sheet down over the form core.

To avoid damaging electronic embedded, carried, glued, or otherwise along the sheet, recesses 60 will form along the top surface 22 of form core 20. Recess provide form a removed space form the top surface of the form core to allow space for portions of the sheet (not shown) to be removed from direct contact with the surface of the form core. Recesses 60 include a recess edge 62 defining the scope and/or shape of the recess. Recesses 60 include recess edges 62 that are shaped to mate with the sheet without causing damages to guarded electronics. Recess corners 61 may be other contours due to the air gap preventing the recess corner form mating with sheet (further depicted with reference to FIGS. 21-24).

Referring to FIGS. 3-6, the top platen used for healing is shown. Platen 10 includes cavity 12 located where a form core will sit, and where a sheet will meet platen 10. Platen 10 includes side edges 118. Perimeter surface 13 will meet with lower base plate (not shown) to provide for a seal. Through platen, mounting clamp sites, or probe holes 18, allow the platen to be mounted to a heating source (not shown). Further, when probe holes are used, a probe may be inserted into the platen to determine monitor characteristics, such as the temperature of the platen. Heat energy can then be transferred to sheet for thermoforming. Air pressure is provided (and/or vacuum) via air pressure channel(s) 19. Platen 10 may include air holes 15 around perimeter 13 of cavity 12 to provide air pressure over the sheet. Air holes 15 are preferably sized approximately on the order of one-mm in diameter on exposure to cavity, but may be sourced from larger air pressure conduits. Air holes 15 may be placed on the platen cavity surface or placed over locations in the form core that will eventually be removed (cut away) form the final formed sheet product.

Figure 7:
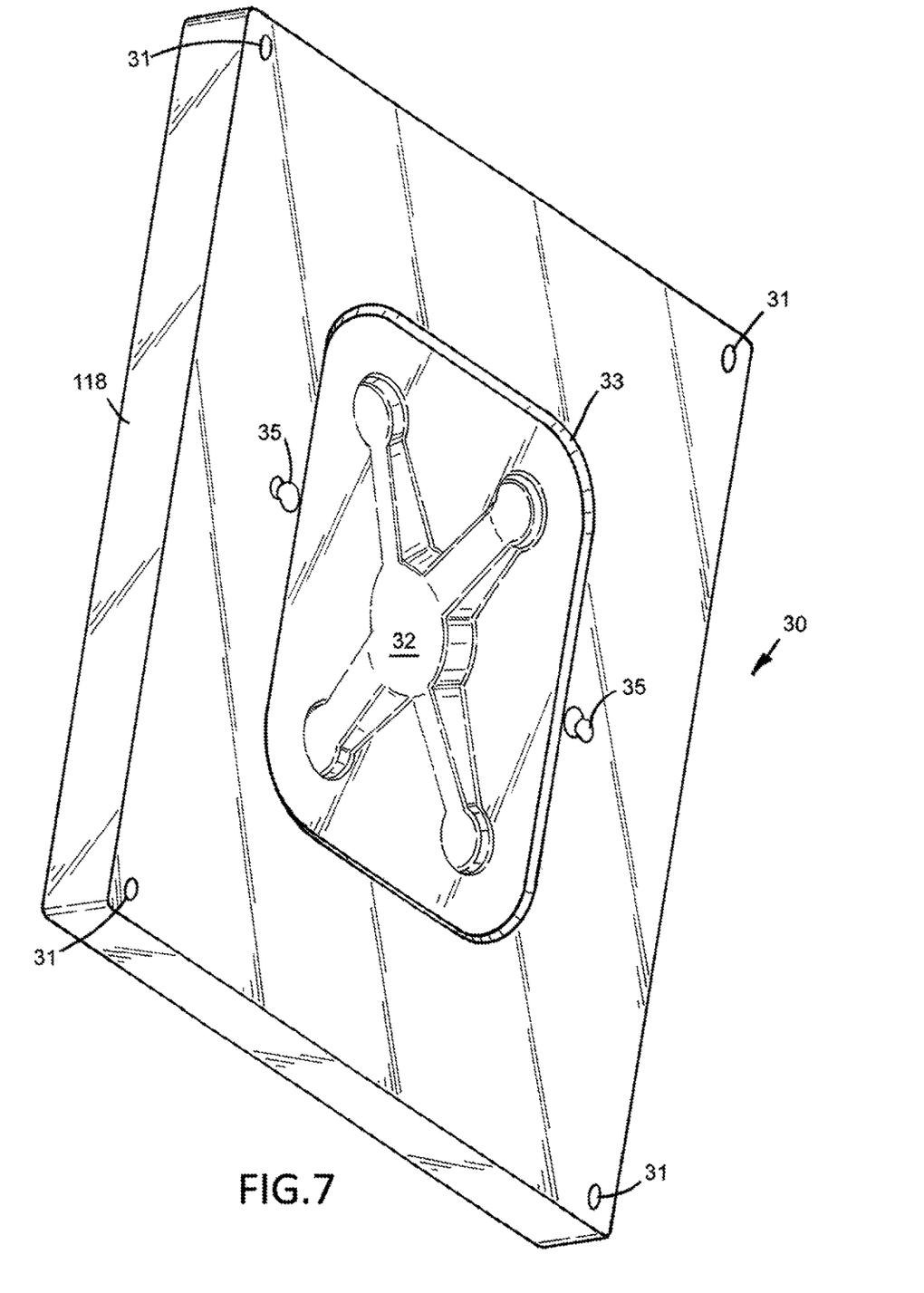
FIG. 7 a perspective top view of a base plate of an embodiment of the present invention.

As shown in FIGS. 7 and 8, and alternative embodiment is shown for the female form core (or cavity). FIG. 7 demonstrates the lower body base plate 30 with a cavity 32 providing for the form core to form a plastic sheet. Cavity includes groove 33 though which air boles may be used to draw and push air so as to manipulate each sheet. Registration pin guides 35 are provided to register the sheet within cavity 32. Bolts 31 are provides to place and secure base plate 30 on a table. In this embodiment, form core may be used as a female cavity form core. FIG. 8 demonstrates the complementary alternative platen 10A with recesses 14 in cavity 12 to provide for protection of plastic sheet mounting/applied electronics. Perimeter surface 13 is provided wherein surface 137 with surface 139 on base plate to provide seal with plastic sheet set there between. Air channels 19 are provided as described above.

As can be seen in FIGS. 9-13, base plate 30 may be provided for a male form core. Form core 20 fits into base plate 30 within cavity 32. Form core 20 may be situated via registration indentations 35 on base plate 30 to mate with complementary registration bosses 28 on form core 20. In some instances, it is preferable to heat the base plate and/or the form core to provide for detailed forming of a sheet. In other embodiments, the material of the form core may be made of an air permeable material as is known in the art, such as a composite material made of aluminum granules and epoxy resin, aluminum crystals, matrices, etc., to allow for air flow through form core to provide for pressures to be directed to a sheet laid thereon and to provide more directed pressuring of sheet through form core. While the platen is preferably made of a heat conducting material, such as solid aluminum, the form core may be made from a metal, air permeable material, or any other rigid material, such as a hard plastic (3-D printed), etc.

Base plate 30 may include a variety of air pathways 119 accessing cavity 32 via air holes 3a spread over top surface of base plate. Preferably, all air holes 38a combine under surface 100 to join air pathways 119 along bottom surface 127. Under form core 20, base plate 30 may include larger air pathways 119 winch may run along a gap vent 138 along the bottom edge 27 of form core 20. Recesses 60 may be formed in form core 20 to provide for access to electronics so as to prevent crushing electronics borne on a plastic sheet (for forming).

Figure 10:
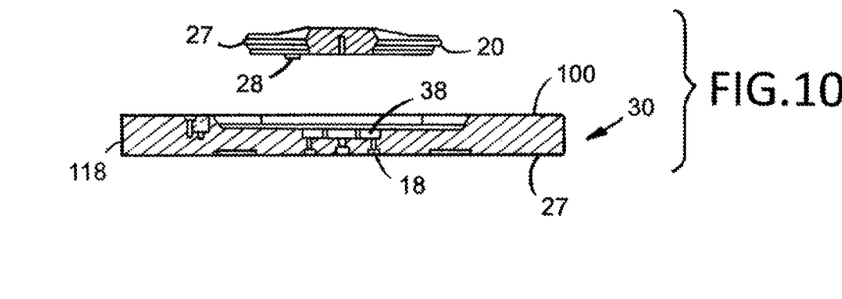
FIG. 10 is a side separated cross-sectional view of the form core and base plate of an embodiment of the present invention along line B-B of FIG. 9.
Figure 11:
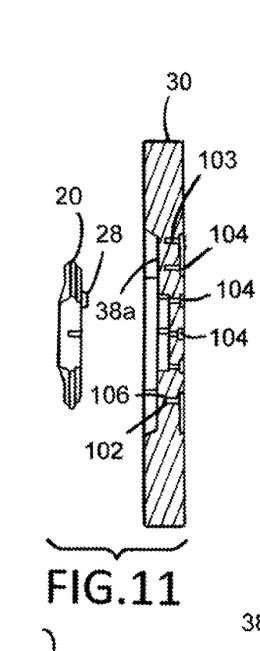
FIG. 11 is a side separated cross-sectional view of the form core and base plate of an embodiment of the present invention along line C-C of FIG. 9.
Figure 12:
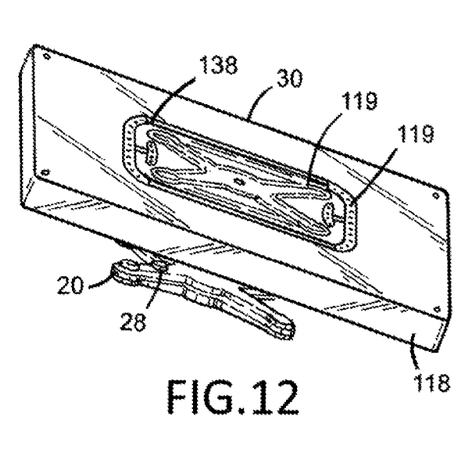
FIG. 12 is a perspective separated view of the bottom of the form core and base plate of an embodiment of the present invention shown in FIG. 9.
Figure 13:
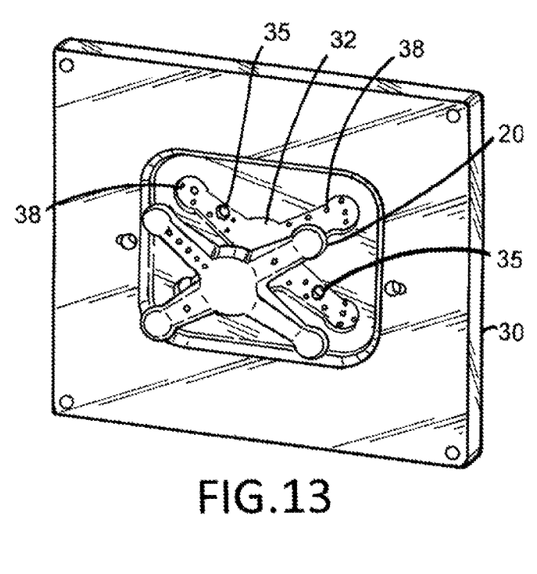
FIG. 13 is a perspective separated view of the top of the form core and base plate of an embodiment of the present invention shown in FIG. 9.

As can be seen particularly in FIGS. 10 and 11, air is vented from base plate 30 via air holes 102 which expand from front 106 of hole to hole width along center 103 of hole and onto wider air channel 119. By providing small front holes, the force of the air pathway vacuum/pressure may be mollified and/or better distributed throughout base plate so as not to unnecessarily distort sheet, and provide a uniform pressure/vacuum along sheet of forming, etc.

As can be seen more particularly in FIGS. 21-24, the recess is shown in cross-section in detail. Recess 60 may include a curved recess edge 62, so as not to cause crimping or otherwise leave fold marks, or tear the sheet at the recess location. The gradual rise of the recess edge 62 allows for proper forming around a three-dimensional mounted electronic unit, such as an LED 76 as shown in this example. An optional O-ring 66 may be included next to or instead of the gradual recess edge 62 to provide additional protection to electronics. The top of recess 60 may include harsher corners 61 which will not mate or otherwise directly interact with sheet. Insulation 57 may be provided around, under, over, the electronic component. Further, conductive inks 56 may be provided to attach LED to circuitry on board the plastic sheet. Conductive epoxy may be provided around the electronic component to encapsulate same and provide for better electrical contact. The space provided from recess top wall 84 to recess walls 86 and sheet or components thereon will typically be filled with ambient gas trapped thereon during the heating and/or forming process providing an air gap 82. Air gap 82 provides for temporary insulation to prevent heat transfer to locations on sheet relative to recesses.

Figure 14:
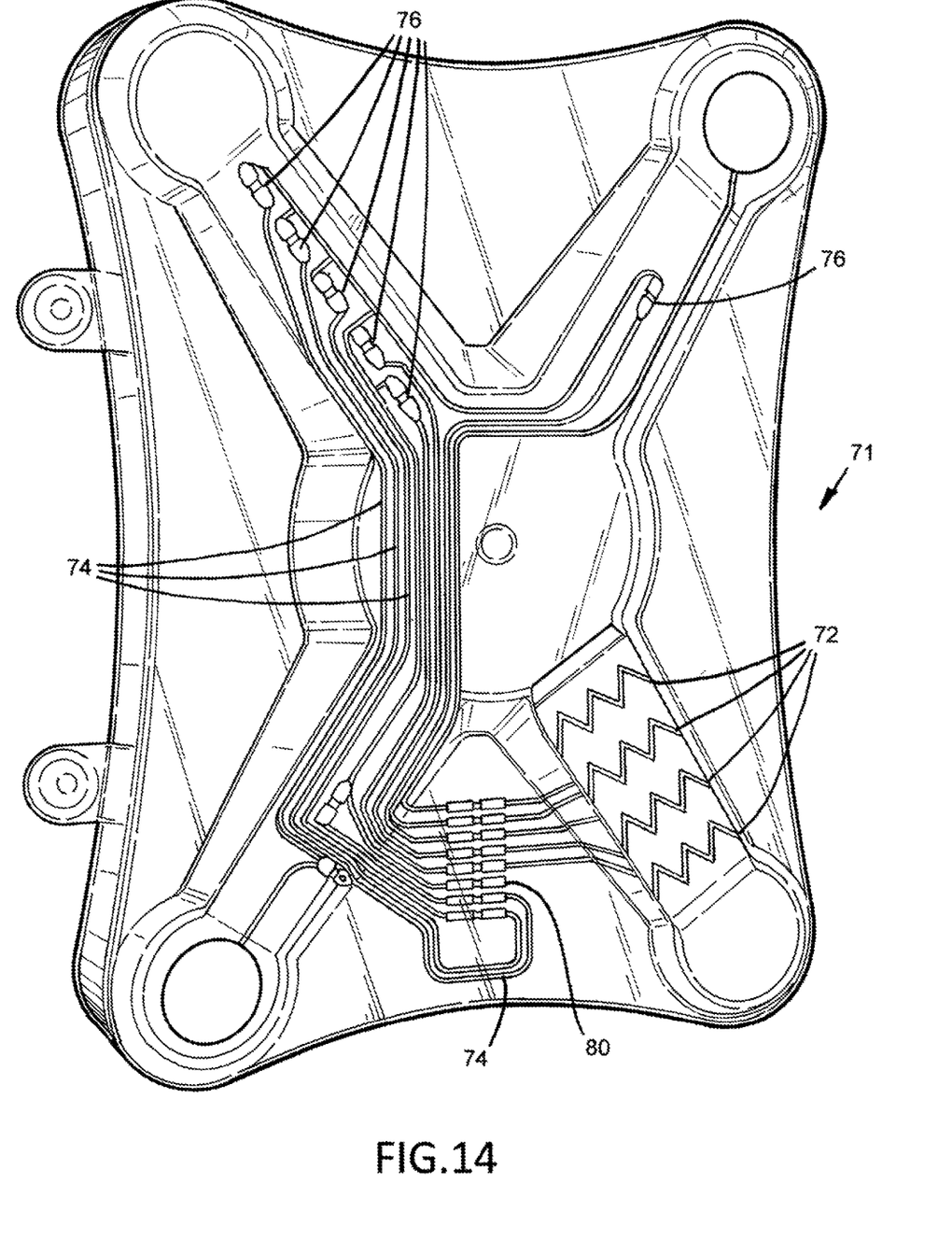
FIG. 14 a perspective view of the top of a finished formed product of an embodiment of the present invention.
Figure 15:
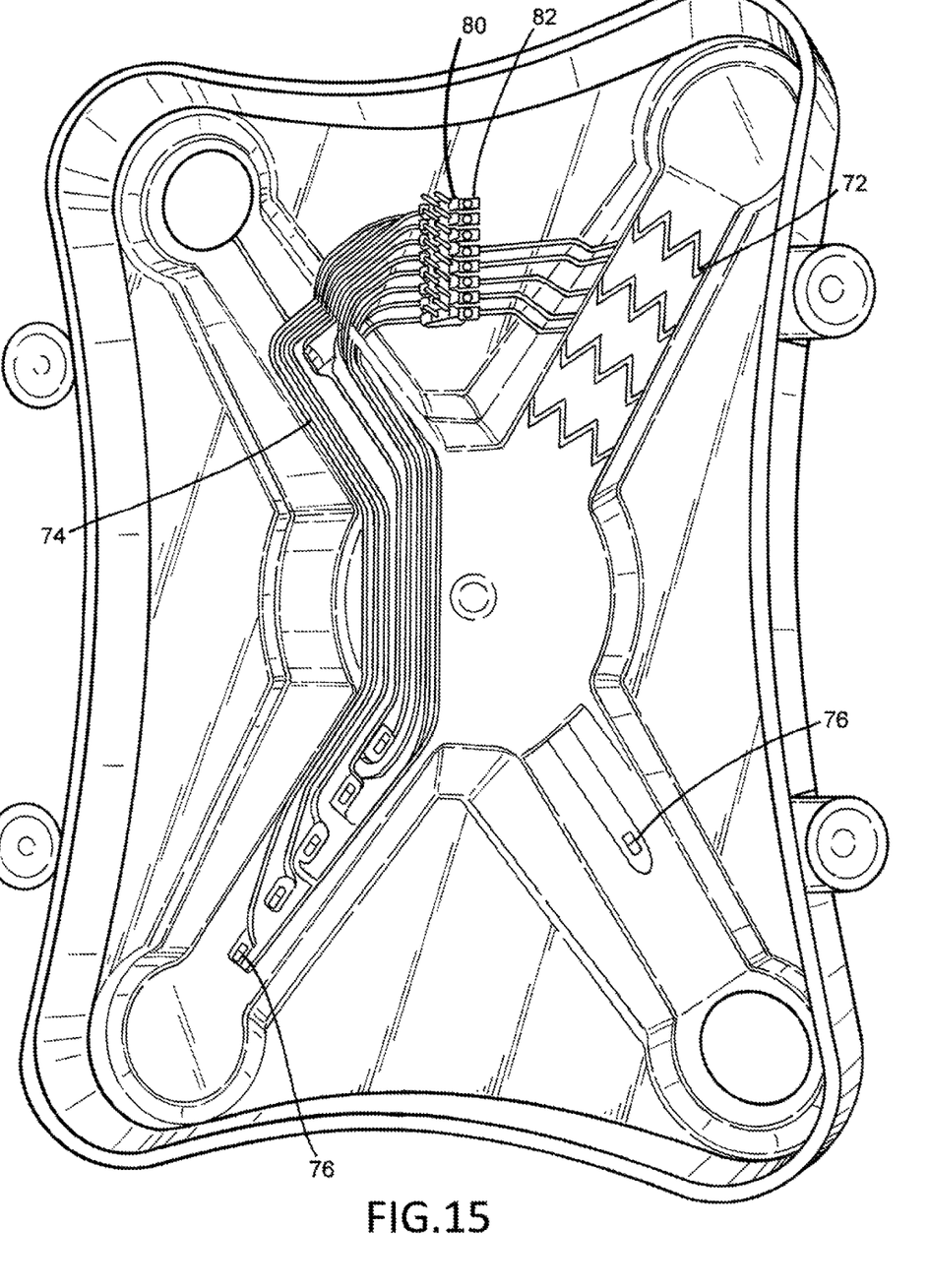
FIG. 15 a perspective view of the bottom of a finished formed product of an embodiment of the present invention.

As can be seen on the finished product model shown in FIGS. 14 and 15, formed sheet 71 includes electronics 70. Circuitry 74 may be printed via a conductive ink. Circuitry may be molded and/or deformed. It is important to compensate for the reshaping, stretching, and deformation of the sheet when determining the thickness and shape of the applied circuitry prior to formation on the raw sheets. Other components, such as LEDs 76 and resistors 80 may be protected by recesses in the form core or platen. A connector 74 may be used to control the various on-board, or off-board connected products. Capacitance strips 72, or embedded buttons may be used.

Figure 16:
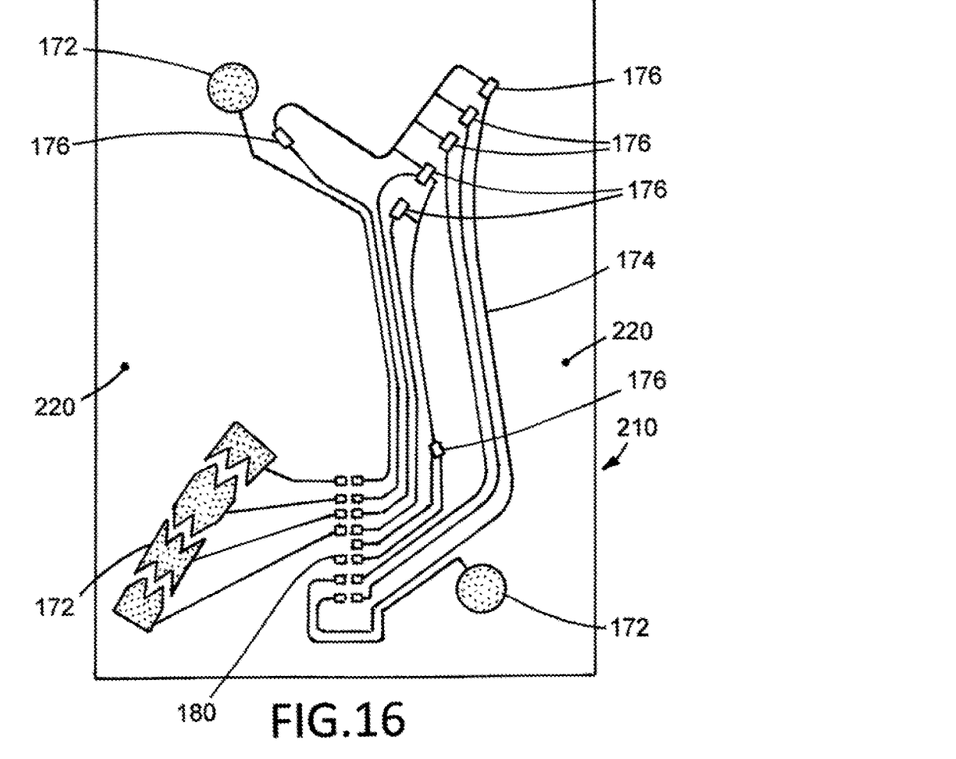
FIG. 16 demonstrates a top view of a raw sheet of an embodiment of the present invention.

FIG. 16 demonstrates a top view of a raw (preferably planar) sheet with surface mounted components and other printed features (such as electronic conductive ink circuitry 174, etc.), the sheet is preferably made of a petroleum-based plastic but may be comprised of any material useful for (de)formation into a final (or intermediate) product. The sheet must be deformable into a three-dimensional shape. Sheet 210 includes registration points 220 which may include apertures for receiving registration pins (such as registration pins on a base plate) (not shown). Mounted components 176 may include any of the various electronic components, but are not limited to electronic components when additional features are intended to be protected from heating and direct pressure. Other electronic features 172 may be included on sheet, such as an electronic connector 180 which may be useful to attach and connect a formed final product to further electronic devices.

Figure 17:
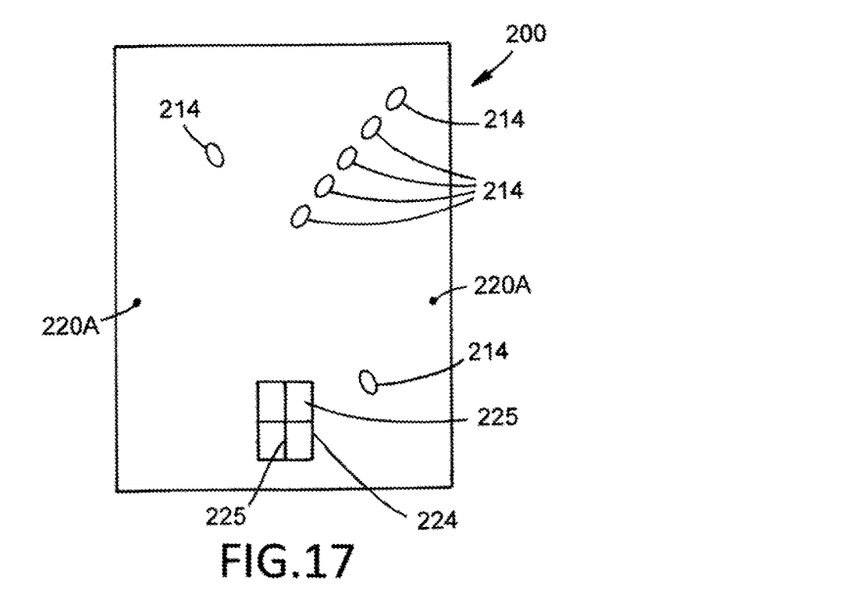
FIG. 17 demonstrates a top view of a blanket of an embodiment of the present invention corresponding generally to the complimentary sheet of FIG. 16.

FIG. 17 demonstrates a complimentary blanket 200 for use and placement over the sheet of FIG. 16 when the heating and/or forming process is applied to sheet. Similarly, blanket 200 includes registration points 220A. Preferably, registration points 220A correspond with the two-dimensional location of registration points of the sheet, thus a single pin may register through both the sheet and blanket and further serve to align components 176 with reliefs 214 found in blanket 200. Reliefs 214 may include apertures sitting over (and around) surface mounted components on the sheet. Reliefs may also include indentations on the underside of the blanket to provide a space into which the components may fit, or otherwise provide for protection against direct contact with a heating platen. Blanket may be formed of any material which is useful as a physical barrier between the sheet and heating platen. Preferably, blanket 200 is made from a thermally conductive material, such as silicone rubber, polymers, elastomers, etc. that will allow the sheet portions in contact with the blanket to be heating via direct heat to the blanket, whereby the blanket directly contacts the sheet. The relief portions provide shielding, and prevent direct contact heal from reaching the corresponding locations on the sheet and any electronic components which may sit at those locations. For larger reliefs, blanket 200 may include support beams 225 which may or may not have the same uniform thickness with other portions of the blanket. Support beams 225 may also be positioned between larger (or more prominent) components mounted on the sheet (such as between electronic pin connectors). Further, blanket may be comprised of a thin-film layer including apertures, such as thermally conductive polyester. The blanket may be separately attached via registration, or adhered to the sheet, or otherwise held together via electrostatic attraction, or static cling (as is known in the art). The blanket may be peeled, or otherwise removed, from the sheet post-forming. Blanket may be laminated onto sheet, as is known in the art. Blanket may be adhered to sheet, preferably via low tack adhesive. In such a manner the blanket may be a one-time use disposable blanket, as opposed to a more reusable blanket discussed above.

Figure 18:
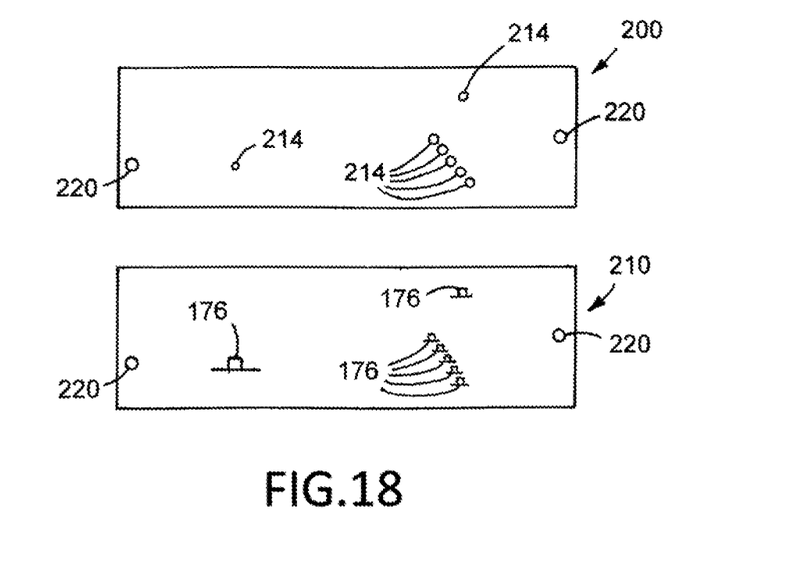
FIG. 18 demonstrates a perspective partially exploded view of a sheet and complementary blanket of an embodiment of the present invention.

As can be seen in FIG. 18, blanket 200 fits above sheet 210 when the heating platen is provided from above. Blanket may include aperture reliefs 214 and registration points 220. Reliefs 214 correspond in two-dimensional location with on-board components 176 on sheet 210. Registration points 220 are provided to assist in aligning blanket and sheet, together, and may also provide for alignment with a form core or base plate (not shown).

Figure 19:
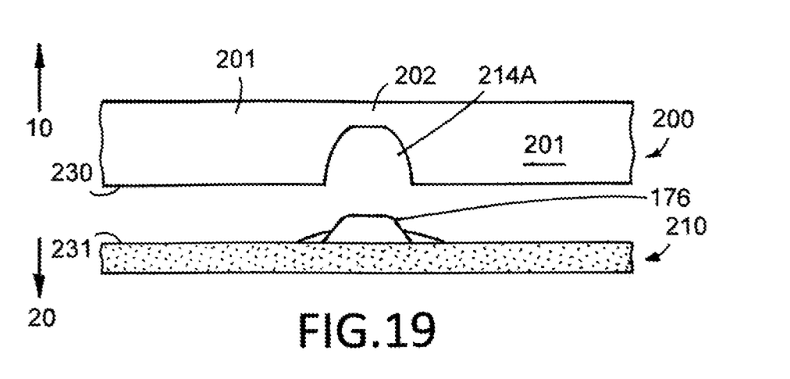
FIG. 19 demonstrates a cross-sectional exploded side view of a blanket and sheet of an embodiment of the present invention.
Figure 20:
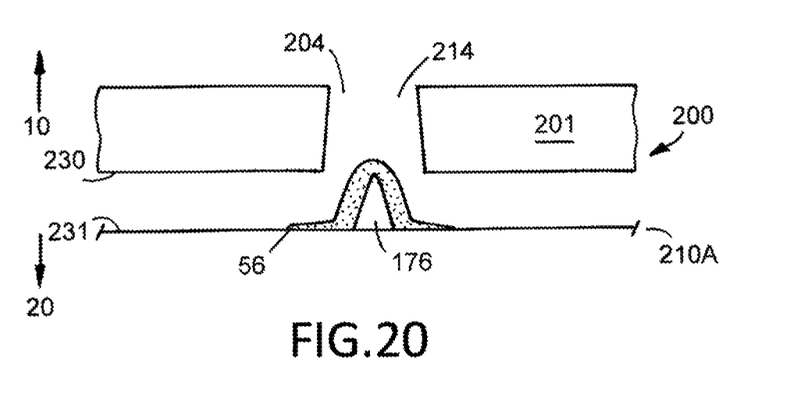
FIG. 20 demonstrates a cross-sectional exploded side view of a blanket and sheet of an alternative embodiment of the present invention.
Figure 21:
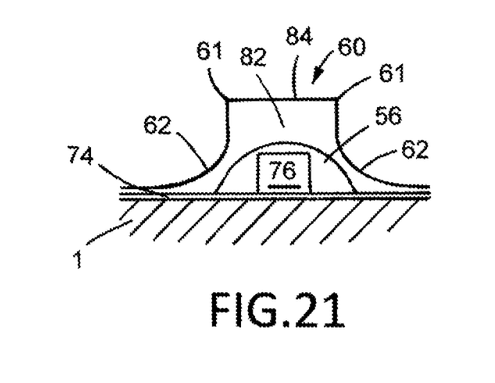
FIG. 21 a cross-sectional view of a recess and sheet with electronics of an embodiment of the present invention.
Figure 22:
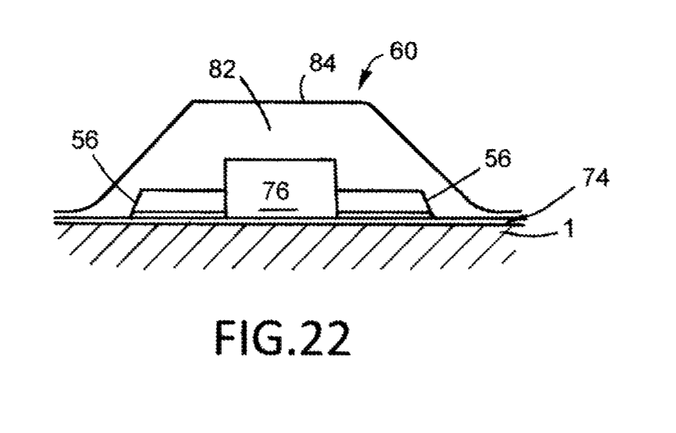
FIG. 22 a cross-sectional view of a recess and sheet with electronics of an embodiment of the present invention.
Figure 23:
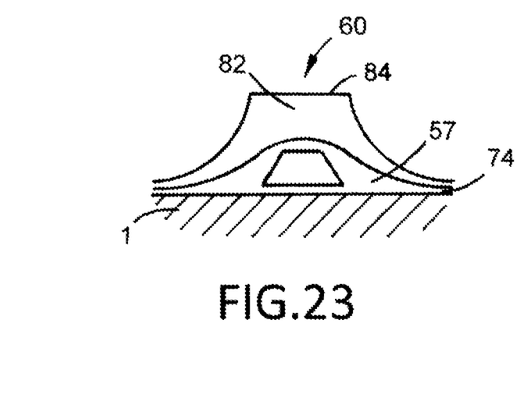
FIG. 23 a cross-sectional view of a recess and sheet with electronics of an embodiment of the present invention.
Figure 24:
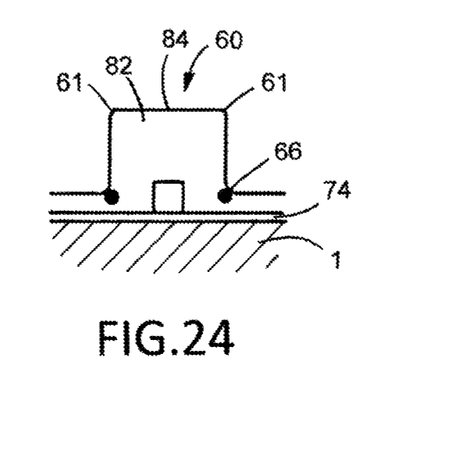
FIG. 24 a cross-sectional view of a recess and sheet with electronics of an embodiment of the present invention.

As shown in FIGS. 19 and 20, blanket 200 fits over sheet 210. Heating platen 10 (shown only by direction) sits over blanket 200, while the form core 20 or base plate sits below. Blanket may include lower surface 230 for direct contact with top surface 231 of sheet 210. In some embodiments, the coefficient of thermal expansion will differ as between blanket and sheet. Therefore, blanket lower surface 230 may be adapted to slide in communication with sheet top surface 210 as may be necessary to retain position of relief(s) over sheet-mounted components. When the coefficient of thermal expansion of the blanket greatly differs from the coefficient of thermal expansion of the sheet, the size of the relief relative to the size of the sheet-mounted component may be modified accordingly so as to avoid tears in the blanket or prevent excessive relief area over portions of the sheet that are to be formed. Blanket 200 may include a first thickness 201 to provide for the physical barrier and transfer of heat energy to sheet 210 as intermediary from heating platen. A cap 202, or thin portion of sheet, may form over the corresponding sheet mounted component 176 to provide an air gap over the component to trap gas between blanket 200 and sheet 210, and thus form relief 214A. Cap 202 will have a thickness less than the main sheet thickness 201. A second blanket (with or without reliefs) may be included between the sheet and form core. When the reliefs are preferably on the underside formed sheet, a single blanket may be used under the sheet between sheet and form core.

In further embodiments, such as embodiment shown with a thinner sheet 210A in FIG. 20, blanket 200 may include a relief 214 as an aperture 204 in blanket 200. In such an instance, an air gap will form between platen and sheet, white blanket 200 provides physical barrier to remove the sheet 210A from the platen 10 and otherwise impart heat to portions of the sheet that are in direct contact with blanket 200. On board components 176 may include conductive inks 56 or other shielding or conductive features that may or may not exceed the width of the relief 214.

We claim:

1. A method of thermoforming a sheet of plastic material having at least one sheet-mounted component disposed thereon into a three-dimensional formed part without compromising function of the component, said method comprising the steps of:
   (a) registering a plastic sheet, the plastic sheet having at least one on-board electronic component defining a sheet-mounted component location on the sheet, onto a form core on a base plate;
   (b) aligning the sheet-mounted component location on the sheet over at least one recess formed in the form core to provide an air gap disposed around the component, the air gap as between the form core and sheet at the sheet-mounted component location, the air gap providing a gap over the component to prevent contact of the component with the form core;
   (c) heating a heated platen over the sheet to at least a glass deformation temperature of the plastic sheet;
   (d) forcing at least portions of the plastic sheet up and against the heated platen, so the plastic sheet is into contact with the heated platen, to transfer heat to the sheet;
   (e) removing the plastic sheet from the platen and drawing the plastic sheet over the form core while maintaining the air gap at the sheet-mounted component location, the air gap disposed around the component and preventing contact between the component and the form core.

2. The method of claim 1 wherein the step of removing is completed via rapid reversal of air pressure against opposite sides of the sheet.

3. The method of claim 1 further comprising providing recesses along a surface of the heated platen corresponding with the sheet-mounted component location when the sheet is registered, the recesses preventing contact of the sheet with the heated platen at the sheet-mounted component location.

4. The method of claim 1 further comprising the step of mounting a blanket having at least one relief, said step of mounting providing for direct contacting of the blanket on the sheet prior to said step of forcing.

5. The method of claim 4 wherein said step of mounting comprises aligning reliefs within the blanket over the at least one component on the sheet to align a cap over the at least ones component, and registering the blanket via registration points over the sheet.

6. The method of claim 4 wherein said step of mounting comprises laminating and adhering a blanket on a sheet via low-tack adhesive.

7. The method of claim 4 wherein said step of mounting comprises placing a thereto-conducting material over the sheet.

8. The method of claim 1 wherein said step of aligning comprises locating an O-ring around the sheet-mounted component location on the sheet.

9. The method of claim 1 wherein said step of aligning comprises locating insulation on top of electronic component at the sheet-mounted component location on the sheet.

10. The method of claim 9 wherein the insulation includes conductive epoxy, the conductive epoxy providing electrical connectivity to the component.

11. A method of thermoforming a sheet of plastic material having at least one sheet-mounted component disposed thereon into a three-dimensional formed part without compromising function of the component, said method comprising the steps of:
    (a) registering a plastic sheet, the plastic sheet having at least one on-board electronic component defining a sheet-mounted component location on the sheet, onto a base plate;
    (b) aligning the sheet-mounted component location on the sheet across at least one recess formed in a heated platen;
    (c) heating the heated platen over the sheet to at least a glass deformation temperature of the plastic sheet;
    (d) forcing at least portions of the plastic sheet up and against the heated platen, so the plastic sheet is into contact with the heated platen, and providing an air gap disposed around the component via the at least one recess, the air gap as between the heated platen and sheet at the sheet-mounted component location to transfer heat to the sheet while maintaining the sheet-mounted component location apart from the heated platen;
    (e) removing the plastic sheet from the heated platen and drawing the plastic sheet over the form core.

12. The method of claim 11 wherein the recess is formed in a distorted shape.

13. The method of claim 11 wherein the recess includes a planar size at least 4% larger than the largest diameter of the at least one component, and the recess includes a curved recess edge.

14. The method of claim 11 further comprising the step of mounting a blanket having at least one relief, said step of mounting providing for direct contacting of the blanket on the sheet prior to said step of forcing.

15. The method of claim 14 wherein said step of mounting comprises aligning reliefs within the blanket over the at least one component on the sheet, and registering the blanket via registration points over the sheet.

16. The method of claim 14 wherein said step of mounting comprises laminating and adhering a blanket on a sheet via low-tack adhesive.

17. The method of claim 14 wherein said step amounting comprises placing a thermo-conducting material over the sheet.

18. The method of claim 11 wherein said step, of aligning comprises locating an O-ring around the sheet-mounted component location on the sheet.

19. The method of claim 11 wherein said step of aligning comprises locating insulation around the Sheet-mounted component location on the sheet.

20. The method of claim 19 wherein the insulation includes conductive epoxy.

* * * * *